United States Patent [19]

Stahl

[11] 3,851,935
[45] Dec. 3, 1974

[54] PIVOTED PAD BEARINGS

[75] Inventor: William F. Stahl, Media, Pa.

[73] Assignee: Westinghouse Electric Corporation, Pittsburgh, Pa.

[22] Filed: May 25, 1973

[21] Appl. No.: 364,160

[52] U.S. Cl. .............................................. 308/73
[51] Int. Cl. ........................................... F16c 17/06
[58] Field of Search ............................ 308/160, 73

[56] References Cited
FOREIGN PATENTS OR APPLICATIONS
957,087  1/1959  Germany ............................. 308/73

Primary Examiner—Charles J. Myhre
Assistant Examiner—Frank Susko
Attorney, Agent, or Firm—D. N. Halgren

[57] ABSTRACT

A pivotable pad bearing for supporting gas turbine rotor shafts. The bearing has pad members that are conically shaped on the transverse axis of their outer periphery. The outer conically shaped periphery of the pad members is enclosed by a stationary shell which has a conically shaped channel into which the pivotable or tiltable pads fit. Grooves are disposed near the conical channel for supplying lubricant fluid around the bearing. This conical configuration between the bearing pads and the shell enclosing the pads allows for a more compact tiltable bearing design.

3 Claims, 3 Drawing Figures

PIVOTED PAD BEARINGS

BACKGROUND OF THE INVENTION

1. Field of the Invention

This invention relates to bearings, and more particularly to self-aligning bearings of the pivoted pad or shoe type.

2. Desctiption of the Prior Art

Tiltable or pivotable pad bearings have had a disadvantage because they have been large, which necessitated a housing of large diameter to accommodate the various components. When space for the bearings is limited, it is difficult to provide lubricating fluid to the bearings. Often the strength of the bearings, the supply of lubrication, or the size of the bearing housing, had to be compromised. Some self-aligning bearings have a spherical seat, but this does not provide much reduction in size, or allow tilting of the bearing. The present invention overcomes these drawbacks to the prior art pivotable pad bearings.

SUMMARY OF THE INVENTION

In accordance with one embodiment of this invention, an array of tiltable bearing pads surround a rotatable shaft. The bearing pads or shoes have concave cylindrical bearing surfaces. The surfaces are lined with babbitt metal. The periphery of the shoes surrounding the supporting shaft is generally of a square shape. The shoes are enclosed and supported in a housing or shell. Each shoe has a truncated apex wherein a tiltable key is disposed. The tiltable key pivotably contacts another key disposed in each corner of a channel in the surrounding shell. The channel for retaining and supporting the pads in the housing is conically shaped. The adjacent sides of the bearing pads are conically shaped, corresponding to the contours of the channels in the shell. A groove for distributing lubricating fluid is disposed on either side of the shell, running adjacent the support channel, and separated from it by a wall of the channel, but supplying lubricants to the channel through a plurality of orifices.

The matched conical shape of the pads and the shell, allows for a smaller pad, thicker in its center, where it needs to be strong, and thinner near its edges. The smaller pad and conical channel in the housing permits a more compact configuration of the entire bearing.

DESCRIPTION OF THE PREFERRED EMBODIMENT

Figure 1:
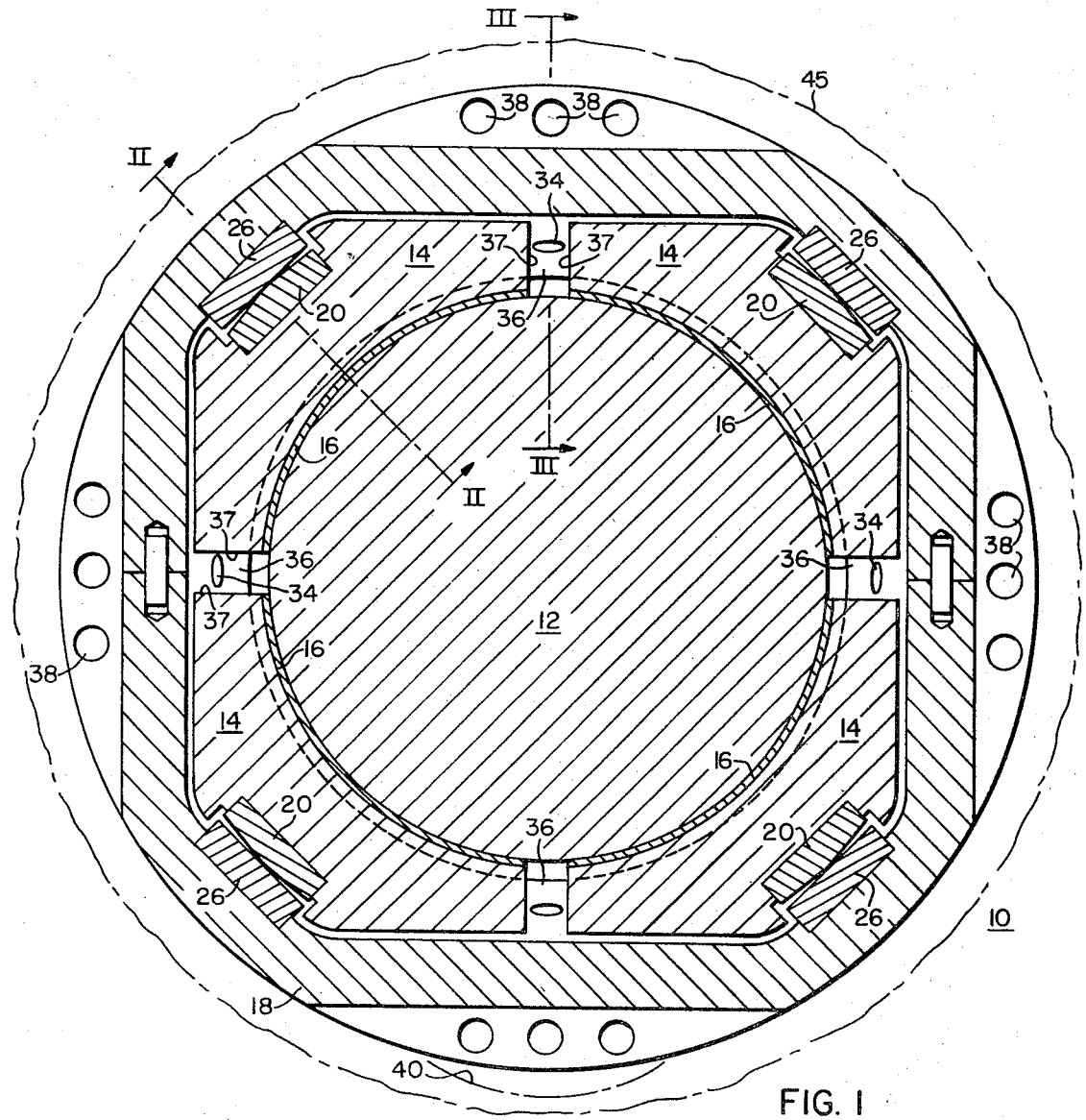
FIG. 1 is an axial view of a bearing embodying the invention.

Referring more particularly to the drawings, especially FIG. 1, wherein a bearing 10 is disposed about a rotatable turbine shaft 12. The shaft 12 is closely surrounded and supported by an annular array of pivotable pads or shoes 14, one in each of its four quadrants. Each shoe 14 has a bearing surface portion 16 of babbitt metal for slidably supporting the rotatable shaft 12.

Surrounding the pads 14 is a bearing shell or housing 18. The outer periphery of the assembled pads 14 generally forms a square, each corner of the square having a curni-linear tilting pad bearing key 20. The outer periphery of the assembled pads could be a polygon other than a square, then the arcuate support segments would be different from the quadrants shown in FIG. 1, and a different number of keys 12 would be provided to correspond to and attach to the different number of shoes.

Figure 2:
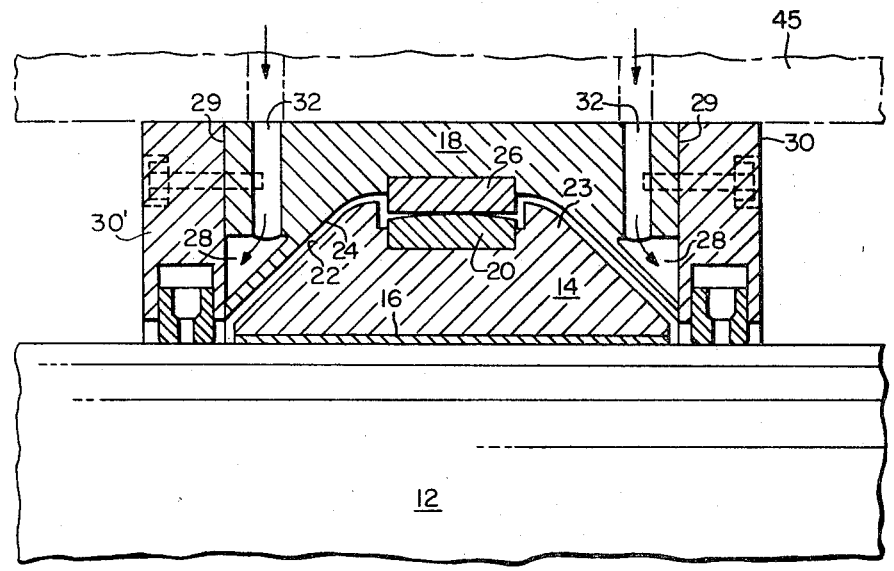
FIG. 2 is a cross-sectional view taken along lines II—II of FIG. 1.
Figure 3:
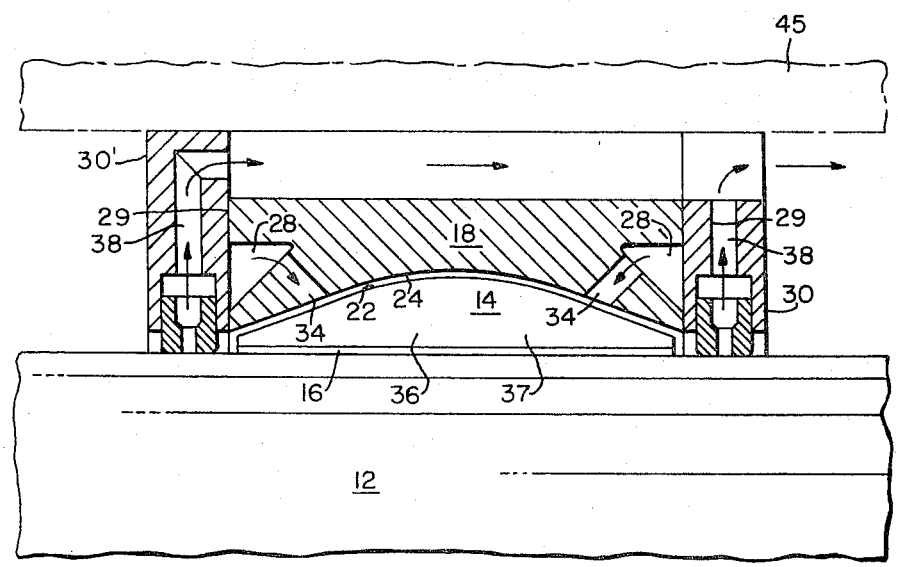
FIG. 3 is a cross-sectional view taken along lines III—III of FIG. 1.

In any case, the invention requires the outer peripheral surface of the pads 14 to have a conical cross-section. The pads 14 and the housing 18 each have conical surfaces, 22 and 24, respectively, of similar configuration and contours as shown in FIGS. 2 and 3. This allows the shoe 14 to be the thickest in its middle section 23, as shown in FIG. 2, where its strength requirements are the greatest. The pivotable key 20 is disposed on the outer portion of the thickest section 23 of the pads or shoes 14. The key 20 is a radially directed cylinder having a slight apex at its radially outward end which pivots upon a flat planar stationary member 26 disposed in each corner of housing 18, thereby providing a slight freedom of pivotable motion to each shoe 14. The radially outward tip of key 20 will rest directly against member 26 of housing 18. Thus, if there is an oil film thickness between the babbitt portion 16 and the rotating shaft 12 which is unequal throughout the perimeter of the shaft 12, the key 20 will tilt slightly on the inner surface of member 26 disposed in the housing 18, and in the radial plane of FIG. 1.

In short, the pad 14 at the thickest point 23 in the transverse direction, as shown in FIG. 2, provides a bearing of minimum size which permits flexural motion of the shaft 12 and allows for a universal movement that can compensate for distortions or irregularities both in a radial plane and in an axial plane.

For the purpose of providing lubricant to each of the bearing shoes 14, a circumferential groove 28 is provided on the upstream and/or on the downstream radially directed sides 29 of housing 18. The open side of groove 28 is covered on the upstream side of the housing 18, by an oil retaining ring 30', and the groove 28 on the downstream of the housing 18, side by an oil retaining ring 30. The retaining rings, 30 and 30', define with the housing 18, two closed annular chambers wherein each groove 28 will serve as a lubricant passageway.

Each groove 28 is in communication with a source of lubricant, not shown, by means of at least one generally radially directed passageway 32 generally radially disposed from groove 28 through the bearing housing 18 to its exterior. The lubricant enters the area between the conical housing surface 24 and the concial pad surfaces 22 and also enters the bearing support surfaces 16, from a plurality of passageways 34 extending from the circular grooves 28 through the housing 18. The lubricant reaches surface 16 by flowing into an area 36 adjacent truncated ends 37 of the shoes 14, as shown in FIGS. 1 and 3.

The upstream or front lubricant seal ring 30', and the rearward or downstream lubricant seal ring 30, as shown on the left and right-hand sides of FIG. 3 respectively, each dispose of lubricant through radial passageways 38. The lubricant from the front oil seal ring 30' discharges axially rearward past the exterior of the shell 18 and past the rearward oil seal ring 30. The lubricant discharged from the rearward oil ring 30 combines with the lubricant discharged from the upstream oil seal ring 30', and flows axially rearward. A drain groove 40, as shown in FIG. 1, disposed axially beneath the housing 18, yet within a containment 45, as shown in FIGS. 2 and 3, permits any lubricant that may have escaped past the upstream oil seal ring 30, to flow rearward to a lubrication drain system, not shown. The lubricant discharged from the upstream and downstream oil seal rings, 30' and 30, as shown in FIGS. 2 and 3, also flows within the containment 45 to the drain system, which is not shown.

It will be readily apparent to those skilled in the art that such a compact bearing arrangement can be used not only in turbines, such as steam and gas turbines, but in other applications, where the bearing supports must be able to move to compensate for eccentricities between a rotating shaft and a stationary housing.

Thus, it will be seen that the present invention provides a relatively simple and inexpensive tilting pad bearing construction for use in turbines and other applications, which is especially useful in applications where radial space of the housing is limited, since it permits compactness and a much smaller diameter housing than heretofore possible. Furthermore, the novel tilting pad bearing may be used to compensate in any apparatus having a rotor in a stationary housing which develops irregularities requiring compensation in both radial and axial planes.

I claim:

1. A tilting pad journal bearing comprising: an array of four tiltable pad members which are annularly disposed so as to encircle a shaft, a stationary housing surrounding said tiltable pad members, means permitting radial and flexural movement to a shaft disposed inwardly of said pad members, said means comprising a plurality of key members disposed peripherally about said pads, the radially outwardly disposed surfaces of said tiltable pad members defining a generally conical cross-sectional shape across both the transverse and longitudinal axes of each pad, said housing having a mating circumferentially disposed channel having a conically-shaped cross-section for receiving said tiltable pad members.

2. A tilting pad journal bearing as recited in claim 1 including at least one circumferentially disposed groove formed in the side wall of said housing adjacent each edge of said conically-shaped channel in said housing, said groove permitting distribution of lubricant to the surfaces of said bearing.

3. A tilting pad journal bearing as recited in claim 1 wherein each of said key members comprises two opposed surfaces; one being planar, the other being curvilinear and in pivotable contact with said planar surface; said pivotable relationship between said housing and said pad members and the conical cross-section of said pad members across both their axes permitting flexural and radially deflecting motion of a rotatable shaft disposed therewith.

* * * * *